United States Patent

Briskman

[11] Patent Number: 5,864,579
[45] Date of Patent: Jan. 26, 1999

[54] DIGITAL RADIO SATELLITE AND TERRESTRIAL UBIQUITOUS BROADCASTING SYSTEM USING SPREAD SPECTRUM MODULATION

[75] Inventor: Robert D. Briskman, Bethesda, Md.

[73] Assignee: CD Radio Inc., Washington, D.C.

[21] Appl. No.: 690,320

[22] Filed: Jul. 25, 1996

[51] Int. Cl.[6] .................... H04B 1/69; H04B 3/36

[52] U.S. Cl. .................... 375/200; 375/208; 375/211; 455/13.1

[58] Field of Search .................... 375/200, 208, 375/211, 205; 455/12.1, 13.1, 13.2, 3.2, 7; 342/353

[56] References Cited

U.S. PATENT DOCUMENTS

| | | | |
|---|---|---|---|
| 5,278,863 | 1/1994 | Briskman | 375/200 |
| 5,303,393 | 4/1994 | Noreen et al. | 455/3.2 |
| 5,319,673 | 6/1994 | Briskman | 375/200 |
| 5,485,485 | 1/1996 | Briskman et al. | 375/200 |
| 5,509,028 | 4/1996 | Marque-Pucheu | 375/211 |
| 5,652,765 | 7/1997 | Adachi et al. | 375/211 |

*Primary Examiner*—Temesghen Ghebretinsae
*Attorney, Agent, or Firm*—Patrick F. Bright

[57] ABSTRACT

A digital radio broadcasting system using spread spectrum modulation transmitted from both geosynchronous satellites and terrestrial repeater stations provides multi-program audio services to mobile and fixed user receivers over a large geographical area in an ubiquitous manner.

20 Claims, 4 Drawing Sheets

DIGITAL RADIO SATELLITE AND TERRESTRIAL UBIQUITOUS BROADCASTING SYSTEM USING SPREAD SPECTRUM MODULATION

BACKGROUND OF THE INVENTION

There are requirements in large countries throughout the world to provide high audio quality, multiple program radio broadcasts. Historically radio broadcasting started with terrestrial stations using low transmission frequencies with AM (Amplitude Modulation). Due to its analog narrowband characteristics, susceptibility to interference and propagation variability, AM terrestrial stations cannot transmit high audio quality broadcasts nor, beyond a local area, provide reliable wide geographical coverage. Subsequently, terrestrial radio stations using higher transmission frequencies with FM (Frequency Modulation) were implemented. These transmit much better quality audio programs, but each terrestrial FM station provides only local geographical coverage (e.g., a 40 km radius is typical) and the signal is analog. Currently several systems which could provide high quality (e.g., compact disc) terrestrial radio broadcast on a local geographical basis using digital modulation are under technical evaluation (Broadcast Engineering Conference Proceedings; National Association of Broadcasters; April., 1996; pp. 5–26 and 115–125).

The requirement to provide high quality, multi-program radio broadcasting on a broad geographical basis (e.g., nationwide, regional or hemispherical) through use of satellites to transmit the radio programs directly to fixed, mobile and transportable receivers on the earth has been proposed (*International Journal of Satellite Communications*; Vol. 13, Nr. 4; July–August 1995; pp. 215–272). With the current state of art and projected advancements in satellite technology, such radio broadcasts from satellites must be within direct line of sight of the user receivers, although multiple satellites can be used to mitigate blockage and certain partial blockage, such as tree foliage and multipath. Multipath can also be mitigated by using higher satellite transmission power. However, current and projected satellites do not have the power transmission capability to penetrate modern buildings or to provide service where heavy satellite signal shadowing exists, such as in the central cores of large cities, with reliable reception of high quality multi-program audio programs. It has been estimated that such blocked or heavily shadowed transmissions would have to be at least a thousand times more powerful than a non-blocked satellite transmission (*Direct Broadcast Satellite Radio*; Nasser Golshan; California Institute of Technology (JPL D-9550); March 1992; pp. 13–18) and, even if this could be eventually accomplished, the cost of the extremely high powered satellites and their launch vehicles would make the service uneconomical.

A solution for providing high quality, multi-program satellite radio broadcast service available to listeners in fixed locations, such as homes and office buildings, and in automobiles moving through heavily shadowed areas is to broadcast the radio service in these particular areas of the country by associated terrestrial broadcast radio stations. This can be accomplished by having such terrestrial broadcast stations receive the satellite transmission and rebroadcast it in a different radio frequency band. Generally there are no suitable additional frequency bands available to accomplish the rebroadcast, and all mobile radio receivers would be more expensive due to the need to receive two frequency bands. It is therefore important to devise methods where the satellites and associated terrestrial broadcast stations use the same transmission frequency without interfering with each other.

A method to use the same radio frequencies for a combined satellite broadcast and terrestrial rebroadcast system has been proposed by French and Canadian organizations (Digital Audio Broadcasting *Proceedings*; European Broadcasting Union; June, 1992; pp. 99–109) and experimental results reported (Digital Audio Broadcasting *Proceedings*; Canadian Association of Broadcasters; March, 1994; pp. 206–235). The method uses a modulation called COFDM (Coded Orthogonal Frequency Division Multiplex), and it has been shown theoretically and by measurement (Digital Audio Broadcasting *Proceedings*; Canadian Association of Broadcasters; March, 1994; p. 179) that coverage gaps occur within the service area when the satellite and terrestrial signals have similar amplitudes but arrive at user receivers with a time differential greater than the system's allowable guard band interval.

The methods and apparatus of this invention use spread spectrum modulation configured to allow satellite radio broadcasting and associated terrestrial radio rebroadcasting of high quality, multi-program audio programs at the same radio frequency so that user reception is possible at all locations ubiquitously over very large geographical service areas.

In part, this invention relates to the inventions disclosed in U.S. Pat. Nos. 5,278,863, issued on Jan. 11, 1994, and 5,319,673, issued on Jun. 7, 1994, and U.S. patent application Ser. No. 08/434,228, filed in the U.S. Patent & Trademark Office on May 4, 1995. By these references, these disclosures are incorporated by reference in this disclosure.

SUMMARY OF THE INVENTION

The present invention allows the implementation of multi-program radio broadcast systems which can provide ubiquitous service coverage over large geographical areas (e.g., the United States) containing diverse terrain and various levels of urbanization. The preferred radio frequency band for such systems is UHF (300–3000 MHZ). Such service coverage is accomplished primarily by use of geosynchronous satellites (see U.S. Pat. No. 5,485,485). However, in the cores of large cities, long tunnels, and inside modern buildings, the signal level from the satellites is insufficient for the user receivers at these locations to provide reliable service (i.e., continuous high quality audio programs). Reliable service is provided at such places by locating terrestrial repeaters which receive and rebroadcast the satellite signal. These repeaters, being close to the user receivers and with relatively high transmitter power, provide sufficient signal power for reception even within modern urban buildings.

There may be more than one terrestrial repeater, more than one geosynchronous satellites, or both, in a core urban area transmitting the same signal. Because these transmissions are at the same radio frequency, a user receiver preferably includes means for minimizing self-interference among a plurality of incoming transmissions. This is particularly difficult since the transmissions can arrive at the user receivers with random phase with respect to each other and with widely differing signal amplitudes.

The invention mitigates such self-interference, thereby allowing ubiquitous service throughout large geographical areas containing diverse terrain and various levels of urbanization with single frequency user radio receivers. This is accomplished by use of spread spectrum modulation where several such transmissions, each encoded with different orthogonal pseudo-noise codes, can occupy the same spectrum and be demodulated at the user receiver without self-interference (*CDMA-Principles of Spread Spectrum Communication*; Andrew J. Viterbi; Addison-Wesley; ISBN 0-201-63374-4; 1995; pp. 123–172). The invention in its most fundamental embodiment assigns a different code to each satellite and terrestrial transmitter. The user receivers in this embodiment have as many pseudo-noise code demodulators as there are transmitters, and each receiver selects the best of those transmissions that can be detected for output of the audio programming. As described subsequently, switching between demodulators as the received transmissions change in signal level or, alternatively, by combining demodulator outputs can be accomplished in the receiver without loss or transient in the audio output program.

The just described fundamental embodiment could require a very large number of pseudo-noise spread spectrum codes. This might not be desirable since the user receiver could become expensive due to the large number of code demodulators required and since the utilized spectrum bandwidth could be insufficient to achieve the necessary transmission spreading ratio (i.e., the spreading ratio is the chip rate divided by the audio program encoded data rate which determines the magnitude of self-interference rejection of orthogonally encoded pseudo-noise spread spectrum transmissions; the chip rate is the transmission rate of the coded signal). Various embodiments of the invention described in the following paragraphs require fewer pseudo-noise codes.

One embodiment reuses the terrestrial pseudo-noise codes by geographical separation (e.g., the terrestrial repeater transmitters in New York City can use the same codes as Philadelphia since the signals from either city are so low in level at the other city as to be undetectable). This geographical re-use alone can be sufficient to permit a user receiver with a small number of different pseudo-noise code demodulators.

Figure 4:
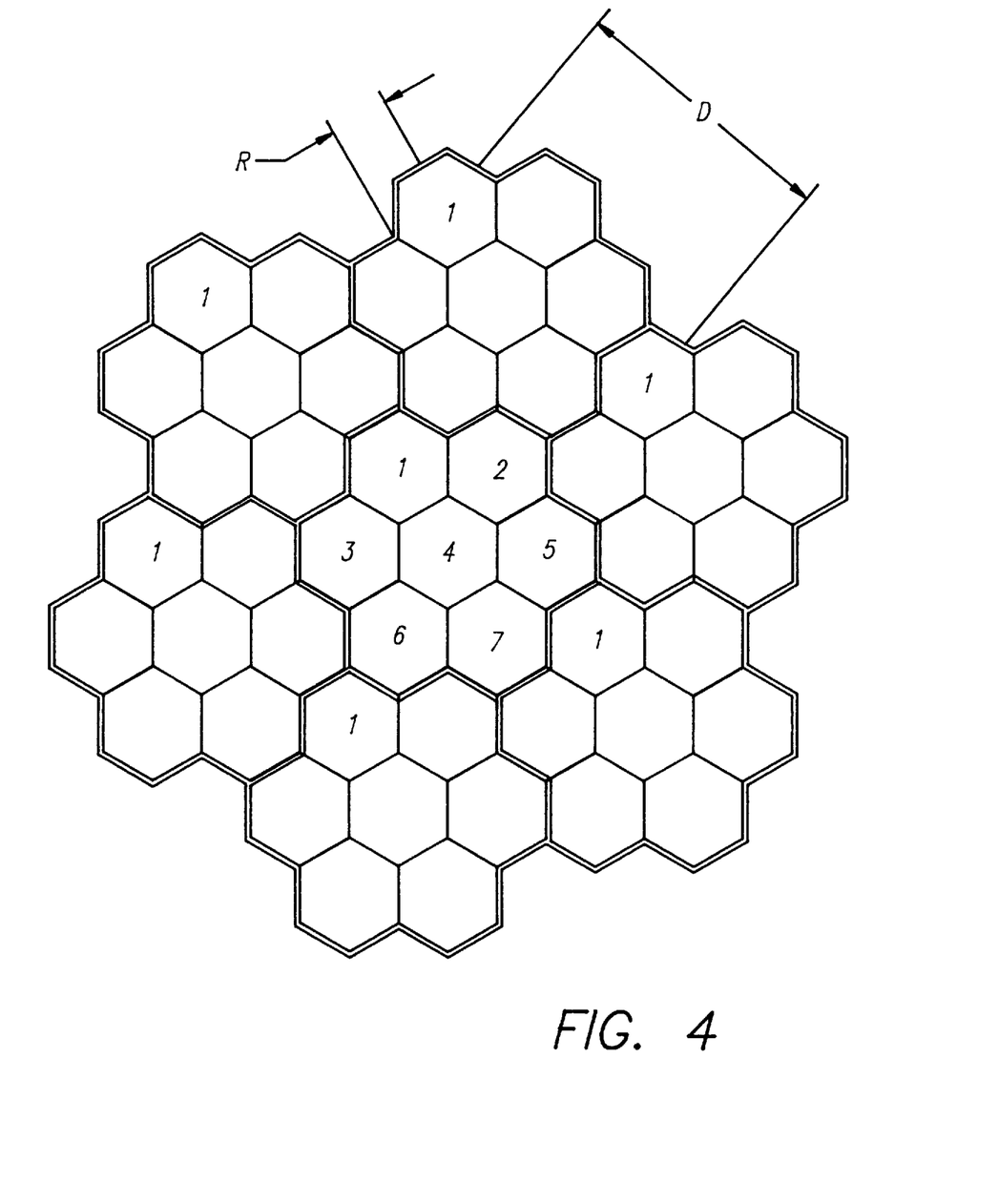
FIG. 4 shows a hexagonal cell configuration of many terrestrial repeaters in a large core urban area allowing re-use of orthogonal pseudo-noise codes every 7 cells.

A second embodiment is where several terrestrial repeaters are required in a large core urban area such as lower Manhattan in New York City. In this embodiment, the spread spectrum code used in one area can also be used in an adjacent geographical area since the combined attenuation from the heavy building blockage and from the transmission path loss caused by the intervening distance provides sufficient isolation between transmitters using identical codes. One specific design is the hexagonal cells shown in FIG. 4, which have been successfully used by terrestrial cellular telephone systems on a frequency re-use basis.

Other embodiments include a user receiver that can change its spread spectrum code and acquire any of a set of predetermined spread spectrum codes available in the area very rapidly. A single demodulator user receiver would generate, sequentially, several orthogonal pseudo-noise codes (e.g., two satellite and three terrestrial). If a transmission of sufficient level modulated with any one of these codes were available to the user receiver, this transmission would be demodulated. This embodiment requires very rapid code generation and code search, very rapid acquisition and very rapid switching between transmissions with different codes during transitions so that the user hears no loss or transient in the audio program content. In this embodiment, a mobile user receiver may acquire an adequate but not optimum strength transmission (i.e., generally requiring more frequent transmission switching). User receivers can search for reception of a transmission with a specific code because the assignment of codes to the transmitters is known a priori.

Another embodiment is a user receiver having two demodulators each with the capability of searching for several differently coded transmissions. This could be configured so that after the first demodulator has acquired a transmission, the second demodulator acquires the next best transmission. If the signal in the first demodulator is abruptly lost, the user receiver automatically outputs the second demodulator signal without loss of audio program output. Potential problems with acquisition times are thereby eliminated in this configuration.

An alternative to this configuration is a three demodulator user receiver. Assuming the first and second demodulators have acquired the best and next to the best transmissions, the third demodulator is configured to search for the appearance of a third transmission and to assess on a continuous basis the third transmission's quality as compared to the other two. This configuration can be further extended to four or more demodulators including the utilization of one such demodulator as a spare.

No difficulties should arise when two or more transmissions are received with different signal strengths (i.e., referred to in CDMA cellular radio as the "near-far" effect). This is because the user receiver is required only to receive one usable transmission, normally the strongest.

The user receiver in the invention utilizes the relative signal strength of the received transmissions in several embodiments to provide improved reception. The received signal strength information can be derived directly by the demodulator after acquisition, or from the amplitude of the correlation pulse (i.e., a voltage waveform indicating that the received pseudo-noise code transmission and the receiver's internally generated pseudo-noise code are identical and in phase).

Another embodiment involves the use of the same pseudo-noise spread spectrum code employed by more than one transmitter. A demodulator in a user receiver will acquire one pseudo-noise coded transmission and then reject others with a degree of rejection equal to the spreading ratio described earlier. This embodiment is configured to ensure that there are no relative amplitude changes in the transmissions such that the necessary degree of rejection is not attained (e.g., large multipath amplitude changes for a mobile user receiver). It is not feasible to resolve acquisition ambiguities in this embodiment. However, such ambiguities occur only when one or more transmissions arrive nearly synchronized (or within 2 chips) with another transmission during acquisition. This should rarely occur and, if such occurrence is foreseen, can be mitigated either by inserting intentional phase delay at the transmitters or by a chip dither circuit in the user receiver or both.

Another configuration of this embodiment includes more than one demodulator, and is referred to as a rake receiver. In this case the first demodulator receives the strongest signal available. The remaining demodulators look for other strong signals occurring within a certain time delay (i.e., strong signal multipath components). Such strong signal(s) are brought in phase with the strongest signal and the demodulator outputs summed. This is commonly called constructive use of multipath.

The preferred embodiments described above provide transmissions with multiple audio programs and wide service area distribution by satellite(s). The invention also operates well with any number of audio programs including a single one and for service areas covered by other than satellite means, such as by terrestrial microwave radio relay.

The invention also includes internal time synchronization derived either from distinct timing signals embedded in the program transmission or in an auxiliary pilot transmission. The time synchronization is employed in the user receiver to switch from one transmission to another without loss or transient in the audio program by using internal delay for achieving an in-phase condition at switching time. Alternatively, the synchronization can be used for achieving time diversity reception, where one or more of the originating program transmitters have their transmission delayed a preset amount from the other(s).

In preferred embodiments, the user receiver selects the strongest transmission available. Multiple demodulator user receiver embodiments can place two or more received transmissions in phase, then add them together. This addition can be accomplished by a maximal ratio combiner or similar technique. Such a combining technique provides a stronger output signal when more than one transmission of reasonable strength is available to the user receiver, where the receiver is equipped to provide summing.

BRIEF DESCRIPTION OF THE DRAWINGS

The system and methods of this invention can better be understood by reference to the drawings, in which.

DETAILED DESCRIPTION OF THE PREFERRED EMBODIMENTS

Figure 1:
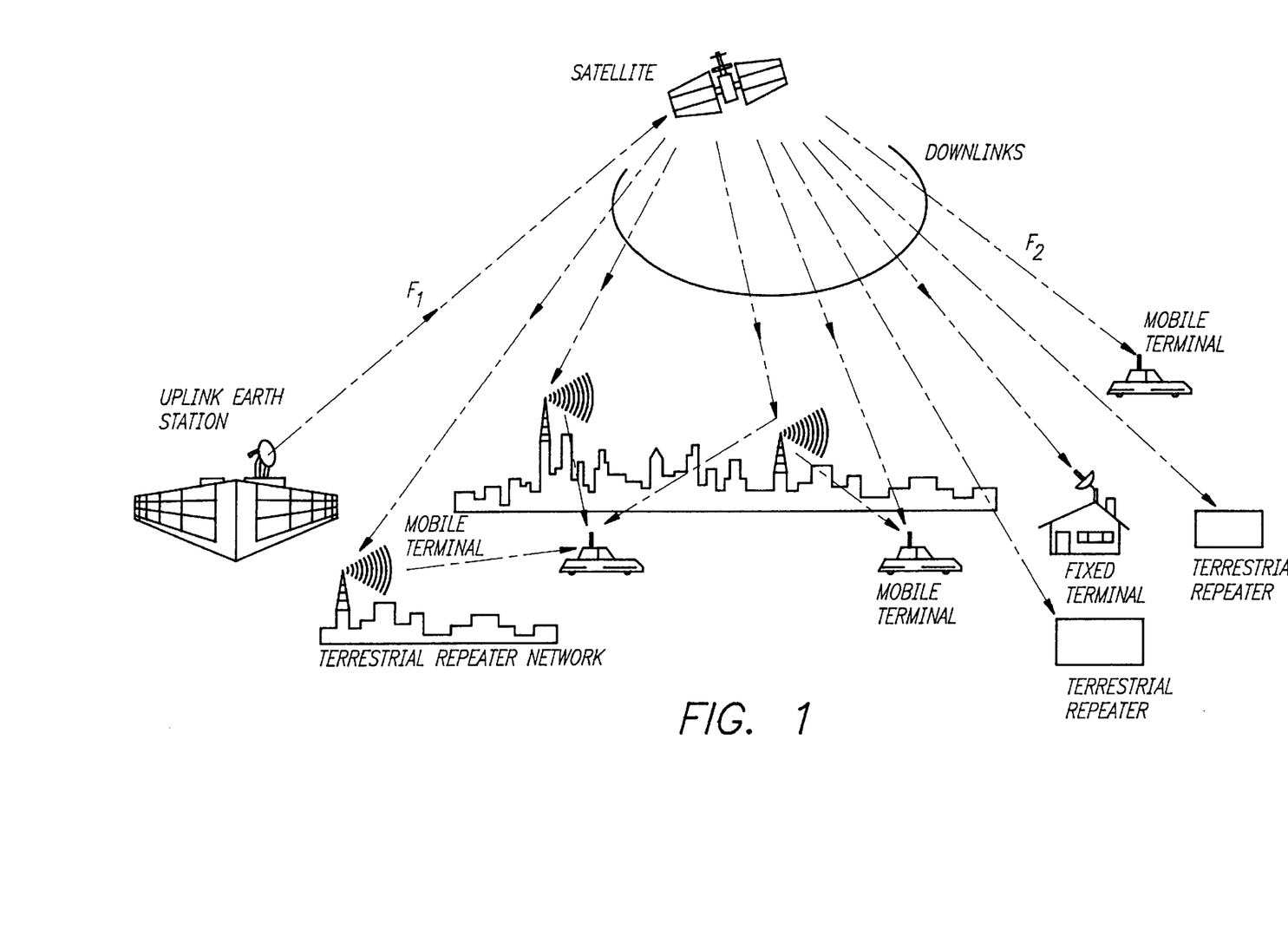
FIG. 1 shows a UHF radio broadcasting system using a single satellite source and, in urban areas, multiple terrestrial repeaters for providing ubiquitous service to mobile and fixed receiving terminals over a large geographical region.

The broadcast signal, consisting of one or more music, voice or ancillary data programs, originates in a programming center and is sent to a geosynchronous satellite by the Uplink Earth Station shown in FIG. 1 using a radio-frequency $f_1$ typically in the 4–20 GHz range. As earlier mentioned, the same transmission may be sent to one or more additional geosynchronous satellites as described in U.S. Pat. No. 5,485,485 to mitigate service outages from multipath fading and blockage. The signal $f_1$ transmitted to the satellite is retransmitted by the satellite to the service coverage area on the earth using a UHF radio-frequency $f_2$ typically in the 0.3–3 GHz range. The geographical service coverage area for such radio broadcast systems is often large (e.g., the contiguous United States).

As shown in FIG. 1, mobile and fixed terminals in the service coverage area with clear line of sight to the satellite(s) receive their service directly from the satellite(s). In core urban areas, there will be too much blockage from buildings. Such blockage creates more service outages than would be tolerable to broadcast radio listeners. There is insufficient signal power from the satellite to penetrate reliably modern buildings so service would be unavailable to listeners in apartments and offices. Such reliable penetration would require satellites over a thousand times more powerful than those now available. Such satellites would be very costly. This problem can be solved by using terrestrial repeaters in the urban cores and in other high blockage situations (e.g., tunnels). The terrestrial repeater receives the low power broadcast signal from the satellite and rebroadcasts the signal at high power.

FIG. 1 shows a mobile receiving terminal moving through a core urban area receiving the rebroadcasted satellite signal from three terrestrial repeaters. The number of terrestrial repeaters required to provide service throughout a specific core urban area can be one or more, depending on the transmitter radiated power of the terrestrial repeater, the severity of the blockage conditions and the geographical extent of the core urban area desiring service. The terrestrial repeaters, due to their high radiated transmit power, can additionally serve fixed receivers inside modern apartment buildings and offices as well as portable receivers (e.g., walkman). As FIG. 1 also shows, a mobile terminal in less dense urban areas can receive good service coverage by intermittently using either the satellite transmission or one of the terrestrial repeater transmissions.

The use of the same radio transmission frequency in both the satellite(s) and terrestrial repeaters is desirable for at least two reasons. The first is economics, since a single frequency, fixed or mobile radio broadcast receiver is less expensive than a dual frequency band receiver and, typically, many millions of such receivers would be utilized. Secondly, frequency spectrum is not widely available in developed countries (IEEE *Communications Magazine*; December 1995; Vol. 33, No. 12; pp. 40–46). Particularly scarce are radio broadcast spectra which cannot have any other types of transmission services throughout the coverage area due to their interference into the user receivers.

Current radio broadcast single frequency networks (SFN), discussed previously, do not adequately address the problem of ubiquitous service. Only one type SFN employing satellites and terrestrial repeaters is now being considered for deployment. It uses coded orthogonal frequency division multiplex, and the broadcast coverage will have areas where a mobile user experiences service outage as described by its proponents in the previously cited reference.

This invention provides a SFN with ubiquitous coverage by using spread spectrum transmission from the satellite(s) and terrestrial repeaters. Two or more such transmissions can be encoded orthogonally to each other, transmitted at the same radio frequency and, when demodulated in a properly designed receiver, the desired transmission is fully recovered while the undesired transmissions are noiselike. The same effect can be achieved using spread spectrum transmission with identical codes, provided the codes of the undesired transmissions are greater than a coding period (i.e., greater than a chip period) out of synchronization with the code of the desired transmission.

Figure 2:
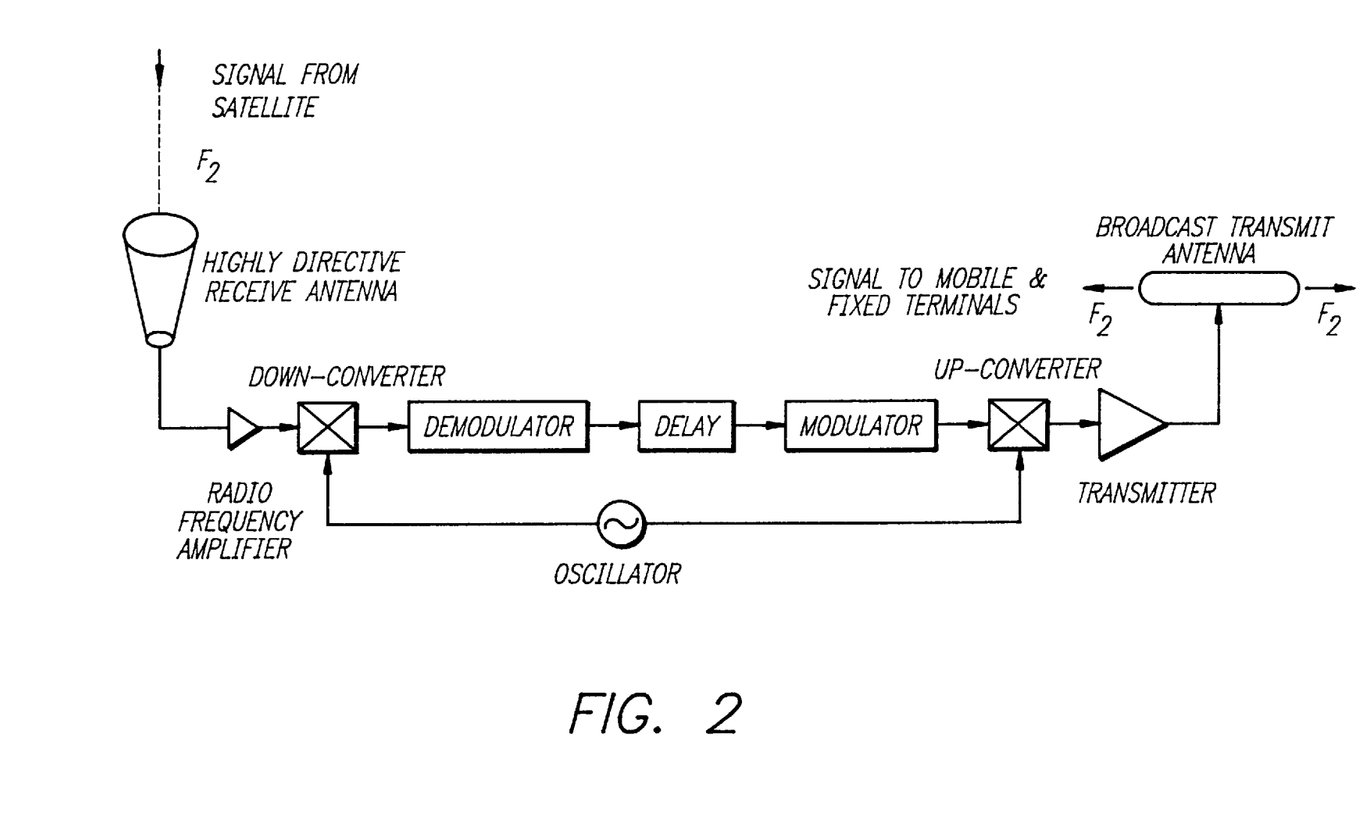
FIG. 2 shows an embodiment of a terrestrial repeater which receives a signal from a satellite and rebroadcasts the signal with high power throughout a limited geographical area. Reception and transmission are done at the same radio frequency, and spread spectrum signal modulation is employed.

FIG. 2 shows one embodiment of a terrestrial repeater for use in this invention. The configuration shown assumes that the satellite transmission at radio frequency $f_2$ uses spread spectrum modulation of a broadcast signal with a quasi-random pseudo-noise code. The terrestrial repeater receives this satellite signal through the antenna and radio frequency amplifier. After the signal is down-converted, filtered and demodulated, the broadcast signal is preferably remodulated using a quasi-random pseudo-noise code orthogonal to that received from the satellite. The remodulated signal is up-converted to radio frequency $f_2$ and is sent to a high power transmitter which sends the signal to mobile and fixed receivers in the local area through the broadcast antenna.

Features of this embodiment are as follows:
1. There are several families of pseudo-noise codes where some of the codes are orthogonal or near orthogonal to each other. One such family which exhibits both good orthogonality and good amplitude characteristics when several of these orthogonal codes are combined is called "balanced Gold codes".
2. The terrestrial repeater receives the weak signal from the satellite and retransmits it at high power using the same radio frequency. The retransmitted signal should not appear at the receiving radio frequency amplifier with significant energy. Otherwise, the received signal would be interfered with or over-ridden. In addition, the terrestrial repeater may self-oscillate (sometimes call "ring-around"). Such performance degradations or failure can be minimized by using a highly directive receiving antenna as shown in FIG. 2, by maximizing the physical spacing between the receiving antenna and broadcast antenna, and by employing artificial or natural shielding of the receiving antenna in the direction(s) of the broadcast antenna(s) or combinations thereof. The shielding can be accomplished by reflective metallic sheets, absorptive barriers, natural building elements (e.g., walls, chimneys, etc.) or combinations thereof.
3. The delay shown in FIG. 2 is not needed if only one terrestrial repeater is required for a particular geographical area and the terrestrial repeater rebroadcasts with an orthogonal code to that transmitted by the satellite. If more than one terrestrial repeater is employed using the same code, a delay may be inserted at baseband in the terrestrial repeater before remodulation. As a result, a mobile receiver may acquire or reacquire one of the terrestrial repeaters without concern about loss of lock due to false correlations. The delay would be of sufficient length that a mobile receiver anywhere within the joint coverage area of the terrestrial repeaters using the same code would not see the rebroadcast signals with the code sequences in phase.
4. When using only a single terrestrial repeater, this embodiment may use the same code as that transmitted from the satellite. In this case, the terrestrial repeater shown in FIG. 2 would not require the down-converter, demodulator, modulator, up-converter and oscillator. Also, the delay element would operate at radio frequency. The delay would be set as described above so that a mobile receiver anywhere in the geographical service area could acquire or reacquire either on the satellite signal or the terrestrial repeater retransmitted signal, whichever is stronger.

Figure 3:
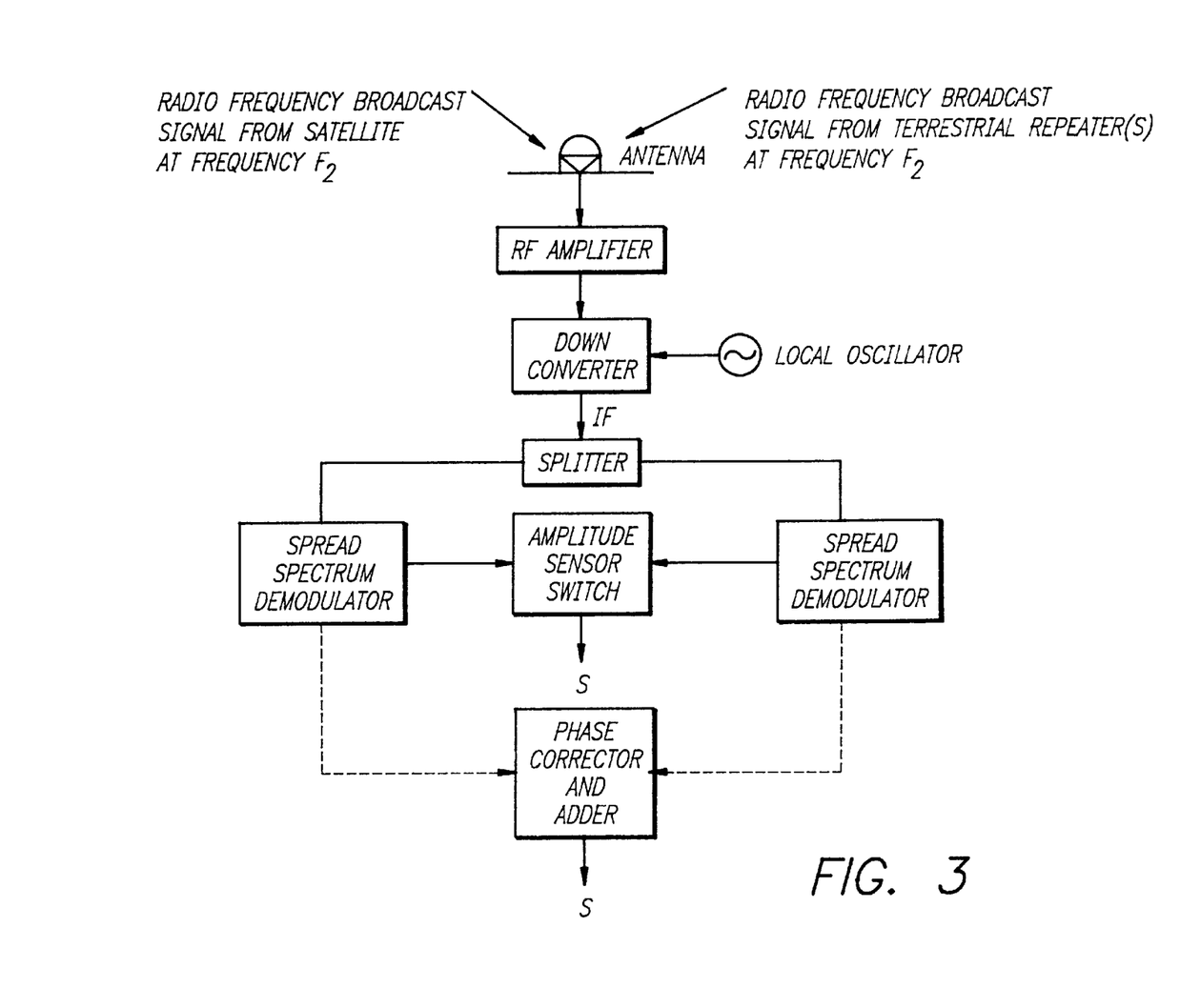
FIG. 3 shows an embodiment of a broadcast receiver for fixed or mobile terminals capable of receiving the broadcast spread spectrum transmission from the satellite(s), from terrestrial repeaters or from both.

FIG. 3 shows the design of a broadcast receiver for receiving the audio program(s) at both fixed and mobile terminals. This receiver includes an antenna capable of receiving the radio frequency transmissions at some UHF frequency $f_2$ from both satellite(s) and terrestrial repeater(s). The transmissions are amplified by a radio frequency amplifier, translated to an intermediate frequency (IF) by a down-converter which is fed by a translation oscillator and, after IF filtering and amplification, are split into equal parts for demodulation.

FIG. 3 shows splitting in half for demodulation of the spread spectrum transmissions by two demodulators. One spread spectrum transmission, say from a satellite, has a certain pseudo-noise code. A second spread spectrum transmission from a terrestrial repeater such as shown in FIG. 2 has a pseudo-noise code which is orthogonal. A spread spectrum demodulator receiving a desired (i.e., predetermined) pseudo-noise code will sense an orthogonal code as quasi-random noise. This embodiment has one spread spectrum demodulator equipped to demodulate one pseudo-noise code, and another demodulator equipped to demodulate an orthogonal code.

The outputs of the demodulators are handled in one of two ways. One way is with an amplitude sensor switch which compares the signal outputs from the two demodulators and outputs the stronger signal to a user's audio system (i.e., the audio amplifier, multiplex program selector, speakers, headset, etc.). Assuming a fast electronic switch at baseband frequency and low delay terrestrial repeaters, the switch is inaudible to a listener since the two audio signals will be almost in phase. If there is appreciable delay in the terrestrial repeaters, this a priori amount of delay can be added to the output of the signal from the spread spectrum demodulator receiving the satellite signal and then the amplitude sensor can again switch in-phase signals. Another way of handling the demodulator outputs is to combine them in a manner that only strong signals predominate such as in a maximal ratio combiner. Again, if the phases of the two output signals differ, they are corrected to an in-phase condition before combining. This can be accomplished in the demodulators or in the combiner. The combiner method better provides an output signal which is totally continuous. When both signals are equally strong, the combiner method provides an output signal to users' audio systems which is stronger than the output signal of the amplitude sensor switch method.

These broadcast receivers are effective as mobile broadcast receivers where the user is in an urban area which precludes continuous viewing of a satellite due to obstructions by buildings or other objects. Assuming a terrestrial repeater signal as described here is available, the receiver of FIG. 3 continuously receives an audio program without interruption throughout the service area. The receiver design of FIG. 3 can be expanded to handle various service coverage requirements and alternative configurations as described below.

The number of required terrestrial repeaters in suburban and quasi-rural areas for ubiquitous coverage can be significantly reduced by using two or more satellites as mentioned earlier. To accommodate more satellites, all that is required is to add additional spread spectrum demodulators to the two shown in FIG. 3, but this includes additional IF signal splitting and associated output amplitude sensing or combining. Each additional spread spectrum demodulator is configured to demodulate a pseudo-noise code orthogonal to those codes used in the existing demodulators. Likewise, additional demodulators can be added to accommodate mobile receivers operating in core urban areas where several terrestrial repeaters with overlapping coverage areas may be required to provide ubiquitous service.

Preferably the number of spread spectrum demodulators in the broadcast receivers is no larger than the sum of the number of satellites and terrestrial repeaters broadcasting on the same frequency plus spares. However, reducing the number of demodulators reduces the cost of a receiver.

The number of usable orthogonal codes depends, in part, on the nature of these codes. For instance, if the aforementioned "balanced Gold codes" were used, the number of these codes equals $2^{k-1}+1$ where k is the spread spectrum encoding shift register length. The shift register length is a function of both the amount of radio frequency spectrum available for occupancy by the spread spectrum modulated signal and by the digital data rate to be broadcast. Where k is 7, for example, the maximum number of orthogonal balanced Gold codes would be 65. If desired, the receiver could have up to 65 spread spectrum demodulators using such types of codes.

Another limit could be the signal to noise ratio at the receiver. As described earlier, the desired spread spectrum demodulator will receive all other satellite and terrestrial repeater signals as noise. These other signals will generally be at levels below the desired signal since, if otherwise, would become the desired signal. A receiver's selection of the strongest signal eliminates the so-called "near-far" problem with cellular telephones using spread spectrum transmissions wherein the strong "near" signal overpowers the weaker "far" signal. However, if there are enough weaker signals received at appreciable signal levels, the additive noise can affect the overall signal to noise ratio of the desired signal. The reduction in overall received signal to noise ratio should not exceed the minimum required.

It is feasible to reduce the number of spread spectrum demodulators required in a user broadcast receiver. A fixed site receiver generally requires a single spread spectrum demodulator since it operates with a specific satellite or, in core urban areas, a specific terrestrial repeater and multipath fading is minimal. However, a second demodulator may be incorporated as a spare or in geographical interface areas equidistant from two or more terrestrial repeaters to insure minor transmission path changes do not cause service outages.

Mobile receivers which can travel anywhere throughout a coverage area (e.g., North America for example) encountering a wide variety of terrain variation, particularly in core urban areas, present different problems. It is feasible to reduce the number of required spread spectrum demodulators in mobile receivers (and the resulting number of different orthogonal code transmissions) as follows:

1. Geographical separation. Terrestrial repeaters can reuse the same orthogonal code if the repeaters are separated from each other by a sufficient distance so that mutual isolation results from transmission path length attenuation. Such re-use is feasible both in geographically separated cities and in a single core urban area because blockage attenuates the average received signal as a fourth power of the separation distance. At some given coverage distance where adequate signal strength is being received (e.g., 1 mile from a terrestrial repeater), a mobile receiver twice that distance from the terrestrial repeater (e.g., 2 miles) would receive a signal 12 dB less. A carrier to interference ratio of 12 dB is sufficient to permit such re-use. This would permit a terrestrial repeater located 4 miles away from another repeater in a core urban area to use the same orthogonal codes.

2. Sequential Operation. A spread spectrum demodulator can be constructed which generates several orthogonal codes and sequentially correlates them rapidly with the incoming transmission to avoid interruption at a receiver. This method is preferred in single frequency networks where only a few different orthogonal codes are used, and where two sequential spread spectrum demodulators are used in tandem. Assuming a first demodulator acquires a transmission with a certain code, the demodulator conveys which code it acquired and its signal strength to a second demodulator which then searches for transmissions with the other orthogonal codes employed by the system. The second demodulator ends its search if it finds another code whose transmission signal strength is higher and the two demodulators then reverse their roles. A third demodulator can also be used to allow the second demodulator to remain on another code whose transmission signal strength is lower than the first demodulator but still useful while the third demodulator searches for code transmissions stronger than the first two code transmissions. This permits instantaneous switch-over if the signal in the first demodulator abruptly drops. Additional demodulators can be used for similar reasons. Sequential code demodulators can also be useful as spares, particularly for replacing a specific fixed code demodulator which has failed.

3. Offset pseudo-noise codes. Where a core urban area requires more terrestrial repeaters than available orthogonal codes in the broadcasting system and re-use of such codes by geographical separation or other means is not feasible, it is feasible in a local area to use the same code. The pseudo-noise code correlator in a receiver demodulator locked to a specific code treats other identically coded transmissions as noise if such other codes are different in arrival time by more than 1 chip duration. Preferably, two or more transmissions using the same code in a specific geographical area where there is sufficient signal strength for more than one to be received simultaneously are offset in time by more than a 1 chip duration. Inserting a delay circuit at radio, intermediate or baseband frequency causes such an offset. A baseband frequency delay is shown in the terrestrial repeater of FIG. 2 for this purpose.

To accomplish the ubiquitous operation of the system and rapid acquisition of transmissions, the radio transmissions in preferred embodiments contain system-wide timing and synchronization signals. Such signals overcome minor receiver frequency oscillator offsets. The signals may be part of the radio broadcast transmission or a separate signal often termed a "pilot".

The receiver in FIG. 3 can be configured to select the stronger of two received transmissions, and to output the stronger to the user's audio system. Alternatively, a receiver can select the strongest transmission of three or more received transmissions if additional spread spectrum demodulators are present. Alternatively, two or more received transmissions can be summed at radio, intermediate or baseband frequency. Preferably, plural received transmissions are brought into phase with one another before selection or summing. Such transmissions are not often in phase because of differing propagation delays. System-wide timing and synchronization signals can be used to control delay circuits which place them in phase with one another. If received transmissions are not brought into phase, an output transient may appear when the selection of a new spread spectrum demodulator is made. Summing in a maximal ratio combiner is feasible where relatively strong transmissions are available at the receiver. Receivers that sum spread spectrum multipath components of a transmission after correction of delay differentials are sometimes called rake type receivers.

What is claimed is:

1. A system for broadcasting radio signals in one transmission channel, said radio signals having frequencies in the range of about 300 MHZ to about 3,000 MHZ, said system comprising a first transmitter located at or near the earth's surface, one or more repeaters located on one or more geo-synchronous satellites for transmitting said radio signals directly to a plurality of fixed and mobile receivers for said radio signals, said plurality of receivers being located at or near the earth's surface, and at least one repeater located at or near the earth's surface, said at least one repeater including means for receiving said radio signals from said one or more repeater located on one or more geo-synchronous satellites and retransmitting said radio signals directly to said plurality of receivers, said first transmitter including a spread spectrum encoder that modulates said radio signals with a first spread spectrum code, said at least one repeater including a spread spectrum encoder that modulates said radio signals with another spread spectrum code, whereby said receivers can distinguish the radio signals from said one or more repeater located on one or more geo-synchronous satellites from radio signals from said at least one repeater and whereby said system can provide ubiquitous broadcast service to said receivers over a large geographical area.

2. The system of claim 1 wherein said spread spectrum encoders at said first transmitter and at said at least one repeater modulate orthogonal spread spectrum codes onto said radio signals.

3. The system of claim 1 further comprising at least two additional repeaters located at or near the earth's surface, said at least two additional repeaters being located sufficiently far from one another that each can use the same spread spectrum code.

4. The system of claim 1 wherein said receivers include at least one demodulator for decoding a plurality of spread spectrum codes in said radio signals.

5. The system of claim 1 or claim 4 wherein each of said receivers includes at least two demodulators, one of said demodulators including means for demodulating a first spread spectrum code from a received signal on a radio frequency channel, and another of said demodulators including means for demodulating a second spread spectrum code from another received radio signal on the same radio frequency channel.

6. The system of claim 1 or claim 3 or claim 4 wherein said receivers include means for selecting and outputting, as a radio program, one of two or more received radio signal transmissions.

7. The system of claim 1 or claim 3 or claim 4 wherein said receivers include means for selecting, summing and outputting two or more received radio transmissions.

8. The system of claim 1 or claim 3 or claim 4 further comprising, at said transmitter, means for adding timing signals to said radio signals for use in said receivers in switching from one received radio transmission to another to form a continuous output program.

9. The system of claim 1 further comprising, in at least one of said repeater, means for delaying transmission of said radio signal by an amount sufficient to avoid signal outage at said receivers.

10. The system of claim 1 or claim 3 or claim 4 or claim 9 wherein said spread spectrum encoders at said first transmitter and at said at least one repeater modulate orthogonal pseudo-noise codes onto said radio signals.

11. The system of claim 2 wherein said spread spectrum encoders at said first transmitter and at said at least one repeater modulate orthogonal pseudo-noise codes onto said radio signals.

12. The system of claim 1 wherein each of said receivers includes means for acquiring a plurality of predetermined spread spectrum codes.

13. The system of claim 12 wherein each of said receivers includes means for acquiring said radio signals with any one of a plurality of orthogonal pseudo-noise spread spectrum codes.

14. The system of claim 1 or claim 3 or claim 4 or claim 9 wherein each of said receivers includes at least two demodulators that include means for acquiring spread spectrum encoded radio signals from two or more transmitters, and means for combining or selecting and outputting, as a radio program, the clearest, strongest signal.

15. The system of claim 1 or claim 3 or claim 4 or claim 9 further comprising means for transmitting a plurality of radio signals that include a plurality of audio programs.

16. The system of claim 1 or claim 3 or claim 4 or claim 9 further comprising, at said transmitter:

means for adding timing signals to each of said radio signals; and means for transmitting an auxiliary pilot signal with each of said radio signals, or both.

17. The system of claim 16 wherein each of said receivers includes means for switching from one radio signal transmission to another to produce an in-phase output program.

18. The system of claim 1 or claim 3 or claim 4 or claim 9 further comprising means for imposing spatial diversity on said radio signals.

19. The system of claim 1 or claim 3 or claim 4 or claim 9 further comprising at least two repeaters and means for imposing a time delay in the range of about 0.5 seconds to about 5 minutes between at least two transmissions of said radio signals with substantially the same content.

20. The system of claim 1 or claim 3 or claim 4 or claim 9 wherein said radio signals include multiple programs of music audio, voice audio, and ancillary data.

* * * * *